(12) United States Patent
Sekine et al.

(10) Patent No.: US 7,023,629 B2
(45) Date of Patent: Apr. 4, 2006

(54) PROJECTION LENS UNIT

(75) Inventors: Kumajiro Sekine, Sano (JP); Isamu Terashima, Sano (JP); Susumu Matsumoto, Sano (JP)

(73) Assignee: Sekinos Co., LTD, (JP)

( * ) Notice: Subject to any disclaimer, the term of this patent is extended or adjusted under 35 U.S.C. 154(b) by 207 days.

(21) Appl. No.: 10/424,138

(22) Filed: Apr. 28, 2003

(65) Prior Publication Data

US 2004/0212904 A1 Oct. 28, 2004

(51) Int. Cl.
*G02B 7/02* (2006.01)

(52) U.S. Cl. .................. 359/820; 359/819; 359/649

(58) Field of Classification Search .......... 359/819–20, 359/822–23, 649, 651, 820; 353/100; 362/455

See application file for complete search history.

(56) References Cited

U.S. PATENT DOCUMENTS

| 4,525,745 | A | * | 6/1985 | Ghaem-Maghami et al. .... 348/745 |
| 5,946,142 | A | * | 8/1999 | Hirata et al. ................. 359/649 |
| 6,104,554 | A | * | 8/2000 | Bodurek et al. ............ 359/820 |
| 6,603,614 | B1 | * | 8/2003 | Fulkerson et al. .......... 359/820 |

* cited by examiner

*Primary Examiner*—Jordan M. Schwartz
*Assistant Examiner*—Jessica Stultz
(74) *Attorney, Agent, or Firm*—Bacon & Thomas

(57) ABSTRACT

A projection lens unit compensates for thermal expansion and contraction. The unit comprises a coupler at the front surface of a CRT, a lens unit body for projecting an image onto a screen by controlling and magnifying the light from the CRT, a plurality of legs secured to the coupler for supporting the lens unit body at more than three points, a slide mechanism (latch arms and latch engaging slots provided between the legs and the lens unit body for slidably supporting the legs for movement along the optical axis relative to the lens unit body, and expansion/contraction bars provided between the legs and the lens unit body for compensating for the thermally induced expansion/contraction, with one end engaged with a leg and the other end engaged with the base of the lens unit body.

20 Claims, 10 Drawing Sheets

US 7,023,629 B2

PROJECTION LENS UNIT

TECHNICAL BACKGROUD

The present invention generally relates to a projection lens unit which is used in a projector and the like for projecting an image at the light source side onto a screen or the like, and, more specifically, to a projection lens unit provided with a function of automatically compensating for the effect of heat.

In recent years, with demand for images of increasingly high definition from a projector and the like, consistent quality of the projected images (image quality) has become required. Accordingly, high performance is required of projection lens units. However, in providing a high quality projection lens unit, the effect of heat becomes a problem.

When the projection lens unit is placed close to the light source, heat of the light source becomes an issue. The ambient temperature also has an affect on the quality. Specifically, thermal expansion and thermal contraction induced by heat of the light source and the ambient temperature change the spacing or refractive index of each lens and the cylindrical body which supports the lenses. When these characteristics are changed in a projector or the like, the image on the screen may become blurred.

U.S. Pat. Nos. 4,525,745 and 5,731,917 attempt to address such problems.

In U.S. Pat. No. 4,525,745, a power lens is supported by a bimetal ring and compensation for thermally induced changes is achieved by causing the power lens to shift using the change in characteristics of the ring with temperature.

FIG. 2 here shows the apparatus disclosed by U.S. Pat. No. 5,731,917 as comprising mainly a cathode ray tube 100 and a projection lens unit 101. The projection lens unit 101 is provided with an inner tube 102, an outer tube 103 and a bimetallic element 104. The inner tube 102 supports a plurality of lenses 105 therein. On the periphery of the inner tube 102 are provided frictional contacts chip 106 which slidably contact the inner periphery of the outer tube 103. The inner tube 102 is slidably supported within the outer tube 103 by the frictional contacts 106. Further, on the periphery of the inner tube 102, a guide member 107 is provided at one end of the bimetallic element 104, extending radially outward from the outer tube 103. The outer tube 103 is secured to a cathode ray tube 100.

The inside diameter of the outer tube 103 is larger than the outside diameter of the inner tube 102, thereby defining a space between the outer tube 103 and the inner tube 102 in which the bimetallic element 104 is inserted.

The bimetallic element 104 is supported by the guide member 107 of the inner tube 102 at one end, and by the outer tube 103 at the other end.

In this construction, as the bimetallic element 104 is distorted by temperature change, the inner tube 102 slides on the outer tube 103, thereby enabling an adjustment of the positions of the lenses 105.

However, the lens unit disclosed in U.S. Pat. No. 5,731,917 has the following drawbacks.

(1) When the inner tube 102 is shifted by thermal distortion of the bimetallic element 104, it moves while in slidable contact with the inner periphery of the outer tube 103 thereby generating a large amount of friction.

(2) While the inner tube 102 has appropriate dimensions for supporting the lenses 105, the diameter of the outer tube 103 is much larger than that of the inner tube 102 to accommodate the bimetallic element 104, thereby increasing the size of the projection lens unit 101.

(3) In the projection lens unit 101 of the above-mentioned construction, the inner tube 102 carrying the lenses 105 cannot be replaced and, therefore, there is no compatibility with other lenses.

(4) Where the inner tube 102 can move only within a limited range, the ability for compensation is limited.

(5) Because the inner tube 102, the outer tube 103, the bimetallic element 104, and the guide member 107 have a complicated construction, assembly thereof is difficult.

(6) Where only one bimetallic element 104 is provided between the inner tube 102 and the outer tube 103 it is not easy to accurately move the inner tube 102 and dimensional accuracy is difficult to achieve.

(7) Where the bimetallic element 104 does not easily transfer heat, the response for temperature compensation becomes poor.

In U.S. Pat. No. 4,525,745, an adjustment is made on only one power lens by the bimetallic ring. However, in many cases, it is not possible to obtain a clear image by adjusting only one power lens because the effect of heat extends to various other components.

SUMMARY OF THE INVENTION

The present invention addresses the above-mentioned problems, and an object of the invention is to provide a projection lens unit which is small, compatible and highly capable of compensating for changes in temperature.

In order to accomplish the above-mentioned object, according to the present invention, a projection lens unit comprises a lens unit body for projecting an image from the side of an image light source, a plurality of legs which secure the periphery of the lens unit body to the side of image light source, and a plurality of expansion and contraction bars, for compensating for the effect of heat, provided between the legs and the lens unit body. Each expansion and contraction bar has one end engaged with the tip end side of the legs and the other end with the base end side of the lens unit body.

In the construction mentioned above, as the temperature increases and the legs begin to expand toward the tip end side, the expansion and contraction bars concurrently begin to expand toward the base end side. Conversely, as the temperature decreases and the legs begin to contract toward the base end side, the expansion and contraction bars concurrently begin to contract toward the tip end side. The dimensions and material of the expansion and contraction bars are selected in consideration of various conditions, so that the changes in characteristics and the like induced by thermal expansion or thermal contraction of the legs and the lens unit body are compensated for by thermal contraction or thermal expansion of the expansion and contraction bars in the reverse direction.

In the above-described projection lens unit, it is desirable that the coefficient of thermal expansion of the expansion and contraction bar is different from those of the lens unit body and the leg.

In the construction described above, when the expansion and contraction bars, the lens unit body, and the legs are respectively distorted by heat, the expansion and contraction bars, having a coefficient of thermal expansion different from other members, compensate for the changes of the lens unit body and the legs.

In the above-described projection lens unit, it is desirable that the legs are supported on the projection lens unit body at more than two places.

In the construction mentioned above, where the legs support the lens unit body at more than two places, compensation for the changes induced by thermal contraction or thermal expansion is achieved evenly at more than two places. However, when the lens unit body is supported at only two places, it is desirable that another member is provided to support the lens unit body so that the lens unit body can stably slide. It is also desirable that the legs are evenly spaced. When the legs are provided at more than three places to support the lens unit body, the lens unit body 6 can be stably supported by these three legs alone, and therefore no additional member is required to support the lens unit body. As described above, by supporting the projection lens unit body with the legs provided at more than three places, automatic compensation is achieved with high accuracy.

In the above-described projection lens unit, it is desirable that the lens unit body comprises an outer lens-barrel which is directly supported on the legs, an inner lens-barrel housed in the outer lens-barrel, and one or a plurality of lenses attached to the inside the inner lens-barrel.

In the construction described above, the outer lens-barrel, which supports the inner lens-barrel to which the lenses are attached, is secured to the side of image light source by the legs.

In the above-described projection lens unit, it is desirable that latch arms or latch arms engaging slots are provided on the legs, and the other of the latch arm engaging slots and latch arms are engaged are provided on the lens unit body, where the latch engaging slots are designed to be longer than the width of the latch arms.

In the construction described above, the legs are mounted on the lens unit body by engaging the latch arms with the latch engaging slots, and at the same time, the legs are allowed to axially slide relative to the lens unit body through the shift of the latch arms in relation to the latch arm engaging slots, thereby achieving the compensation mentioned above.

BRIEF DESCRPTION OF THE DRAWINGS

DESCRIPTION OF THE PREFERRED EMBODIMENTS

Figure 1:
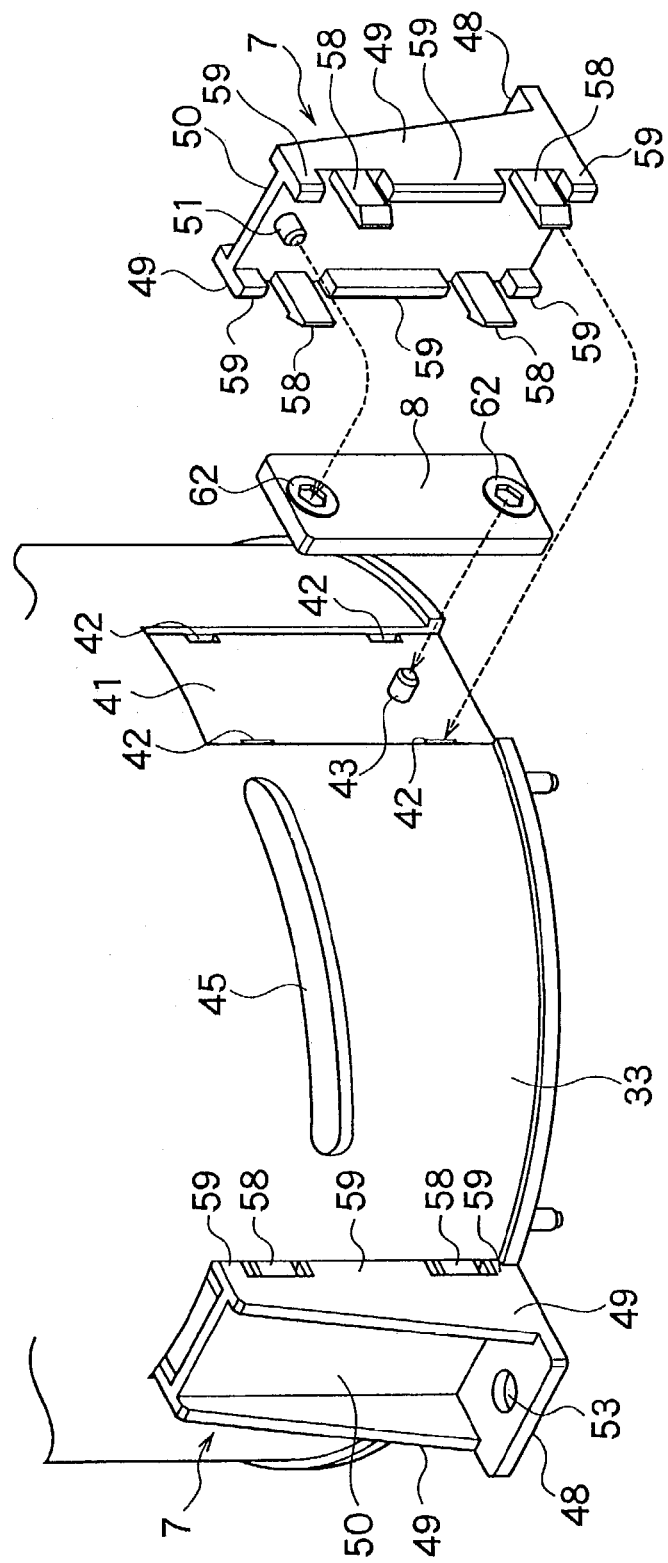
FIG. 1 is a perspective view showing a base end portion of a lens unit body and legs according to a preferred embodiment of the present invention.
Figure 2:
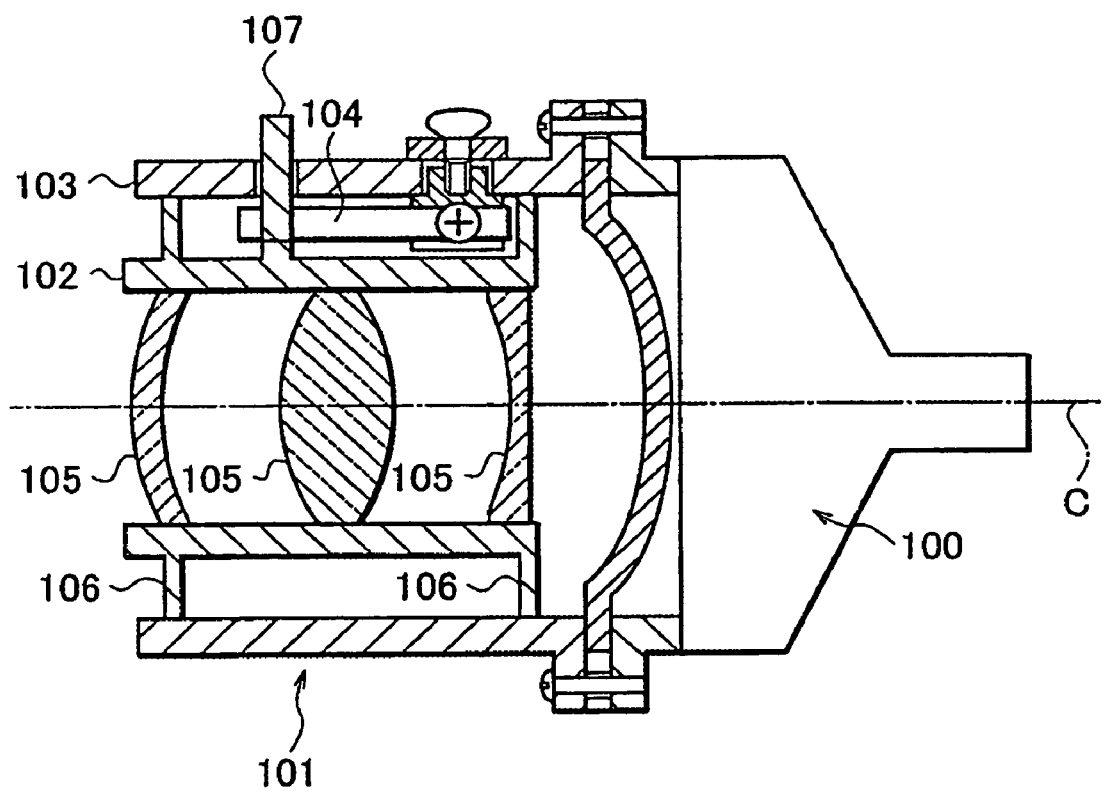
FIG. 2 is a sectional side view of a conventional projection lens unit.

Referring now to the drawings, preferred embodiment of a projection lens unit according to the present invention will be described in detail below. In the following description, it is assumed that the projection lens unit is incorporated in a projector. Two embodiments of projection lens units will be described herein.

In a projector, an image which is formed by a CRT 1 is magnified by a projection lens unit 2 and projected onto a screen (not shown), as shown in FIG. 3 to FIG. 7. Accordingly, the projection lens unit 2 is directly fixed to the CRT 1. The CRT 1 and a coupler 5 of the projection lens unit 2 are integrally secured by CRT support fittings 3 (refer to FIG. 6). The front surface of the CRT 1 (left surface in FIG. 3) is formed as a flat plane on which the coupler 5 is mounted.

Figure 3:
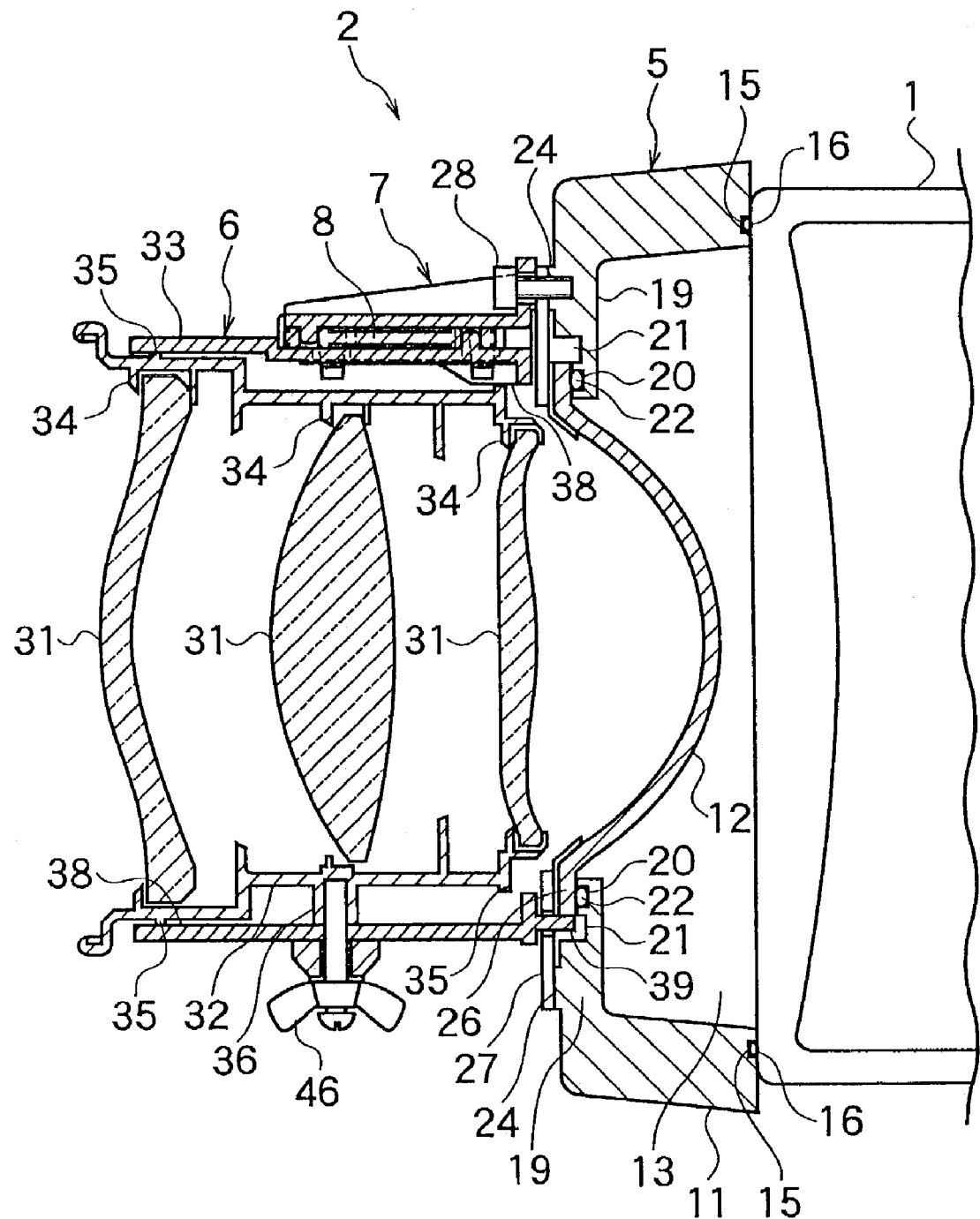
FIG. 3 is a sectional side view showing a CRT and a projection lens unit according to the embodiment of FIG. 1.
Figure 4:
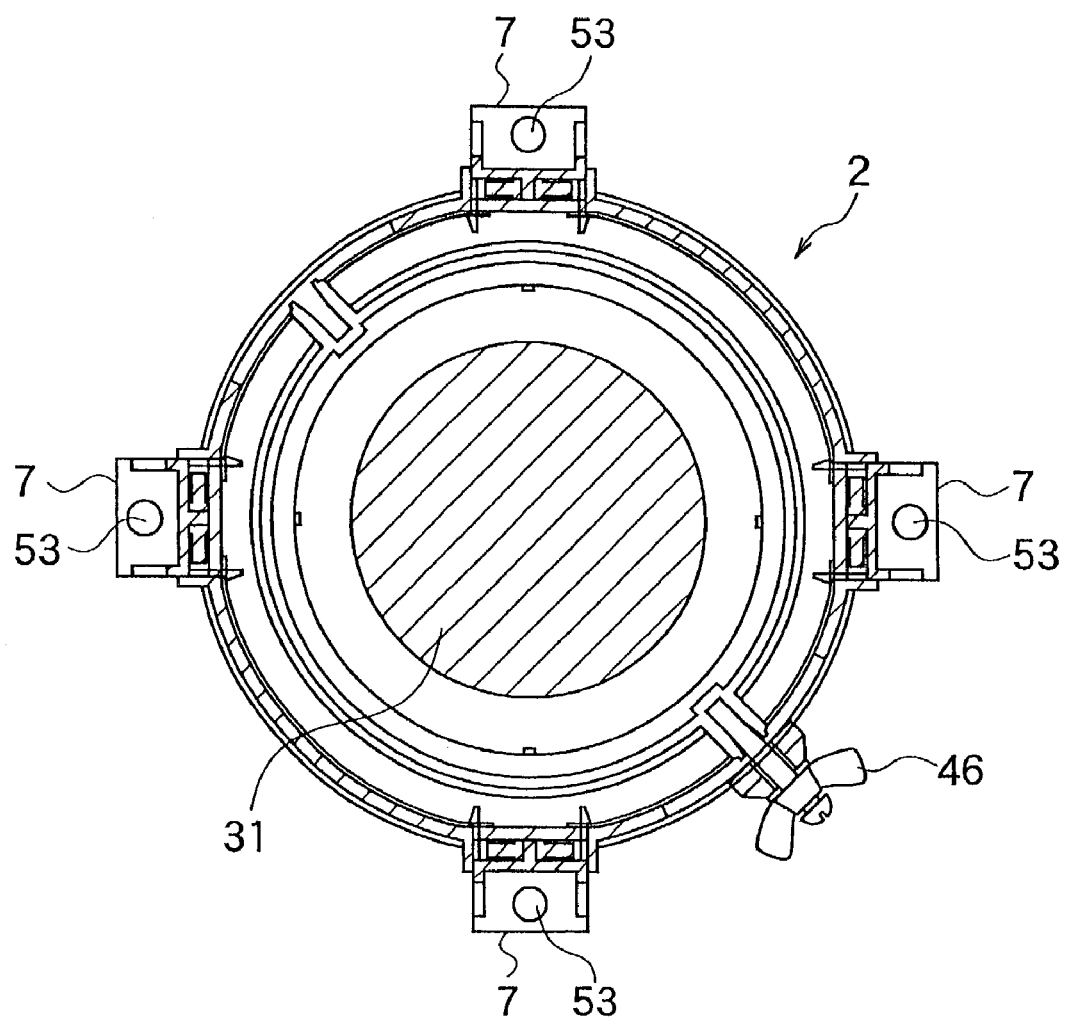
FIG. 4 is a front view of the projection lens unit of the embodiment of FIGS. 1 and 3.

A first preferred embodiment of the projection lens unit 2 is shown in FIG. 3 and FIG. 4. The projection lens unit 2 projects an image, which has been formed by the CRT 1, onto a screen by focusing thereon. The projection lens unit 2 comprises a coupler 5, a lens unit body 6, a plurality of attachment legs 7 and a plurality of expansion and contraction bars 8 (hereinafter, "expansion/contraction bars").

The coupler 5 includes an outer cylindrical portion 11, a C element 12 and a cooling liquid 13. The outer cylindrical portion 11 is formed into a generally thick cylinder with its base end (right end side in FIG. 3) being attached and mounted on the periphery of the front surface of the CRT 1. On the inner periphery of the base end surface of the cylindrical portion 11, a circular groove 15 is formed, in which a seal ring 16 is provided. The seal ring 16 serves to seal the space between the base end of the outer cylindrical portion 11 and the front surface of the CRT 1. On the outer periphery of the base end of the cylindrical portion 11 are a plurality of support legs 18 (refer to FIG. 6), forming an integral part of the above-mentioned CRT support fitting 3. On the opposite end (left end in FIG. 3) of the cylindrical portion 11, is a flange portion 19 which extends radially inward. At the outer surface of the flange portion 19 is a circular groove 20 and an isolation groove 21. The isolation groove 21 serves to reduce the contact area in order to alleviate the effect of heat. A seal ring 22 in the circular groove 20 provides a seal between the C element 12 and the outer cylindrical portion 11. The outer surface of the flange 19 has a plurality of raised supports 24. The raised supports 24 are provided for securing and supporting the legs 7 through the C element retaining plates 27. Four raised supports 24 are equally spaced, and a bolt hole 25 is provided in each raised support 24 for receiving a mounting bolt 28.

The C element 12 together with the front surface of the CRT 1, the outer cylindrical portion 11 and the cooling liquid 13 define a concave lens. The C element 12 is formed as a partial circle or oval in cross-section. A flange portion 26, in the form of an annular flat ring, is provided on the periphery of the C element 12. The flange portion 26 is mounted in contact with the seal ring 22, thereby sealing to the outer cylindrical portion 11. The flange portion 26 is fixed to the outer cylindrical portion 11 by C element retaining plates 27, each of which is formed as a flat ring. The C element retaining plates 27 are secured to the support tables 24 by the mounting bolts 28.

The cooling liquid 13 is an integral part of the concave lens of the coupler 5, and serves to absorb heat from the CRT 1. The cooling liquid 13 fills the space which is sealed by the outer cylindrical portion 11, the C element 12, the front surface of the CRT 1 and two seal rings 16 and 22, thus defining the concave lens.

The lens unit body 6 serves to project the image formed on the CRT 1 onto the screen by controlling the light from the CRT 1. The lens unit body 6 is comprised of one or a plurality of lenses 31, an inner lens-barrel 32 and an outer lens-barrel 33.

The lenses 31 are a combination (plurality) of concave lenses and/or convex lenses, which are selected in accordance with the design.

The inner lens-barrel 32 accurately supports each lens 31 in its designated position. On the inside surface of the inner lens-barrel 32, lens supports 34 are provided with the designated spacing so as to support each lens 31. On the periphery of the inner lens-barrel 32 are frictional contacts 35 which come into frictional contact with the outer lens-barrel 33, whereby the inner lens-barrel 32 is supported by the outer lens-barrel 33. Thus, the inner lens-barrel 32 is supported by the outer lens-barrel 33 at the frictional contacts 35 and is secured to the outer lens-barrel 33 by a focus lock screw 46 which will be described later. The inner lens-barrel 32 is designed to be detached from the outer lens-barrel 33 merely by removing the focus lock screw 46 to enable replacement by another inner lens-barrel 32 of a different design. Thus, where the outer lens-barrel 33 is adaptable to various types of CRTs 1, it is possible to adapt to various types of CRTs 1 by installing an inner lens-barrel 32 corresponding to a particular CRT 1. Also, where various types of inner lens-barrels 32 are made to be interchangeable with an outer lens-barrel 33, it is possible to use various designs for lens unit body 6 with the CRT 1. On the periphery of the inner lens-barrel 32 is a threaded nipple 36 which receives the focus lock screw 46. The threaded nipple extends outwardly to a position where it contacts the inner periphery of the outer lens-barrel 33. The inner lens-barrel 32 is supported by the outer lens-barrel 33 alone and does not contact the coupler 5.

Thus, the outer lens-barrel 33 houses and slidably supports the inner lens-barrel 32, while secured to the coupler 5. The inside surface of the outer lens-barrel 33 has an inner lens-barrel support portion 38 which frictionally contacts the frictional contacts 35 of the inner lens-barrel 32. Accordingly, the outer lens-barrel 33 supports the inner lens-barrel 32 for axial extension and retraction. The outer lens-barrel 33 is secured to the outer cylindrical portion 11 of the coupler 5 by the legs 7. In other words, the outer lens-barrel 33 is not directly secured to the outer cylindrical portion 11 but, rather, is secured through the legs 7.

The periphery of the base end of the outer lens-barrel 33 is provided with a plurality of leg receiving recesses 41 in which the legs 7 are mounted. Each leg receiving recess 41 is a square recess corresponding to the shape of the leg 7 and a plurality thereof are equally spaced at four locations on the circumference. Close to the four corners of each leg engaging recess 41, are respective latch-engaging slots 42. The latch-engaging slots 42 are openings which receive and are engaged by latches 58 of a leg 7. Each latch-engaging slot 42 is sized to be slightly longer than the width of the latch 58 so that the lens unit body 6 supported by the legs 7 can extend and retract in the direction of the optical axis. This allows the lens unit body 6 to deviate in the direction of the optical axis through the compensation by the expansion/contraction bars 8. Toward the bottom of each leg receiving recess 41 (see FIG. 1) is a columnar support boss 43. The support boss 43 supports the expansion/contraction bar 8 by insertion within one of engagement holes 62 of the expansion/contraction bar 8.

On the peripheral surface of the outer lens-barrel 33 is an elongated slot 45 which receives a focus lock screw 46. The focus lock screw 46 inserted through the elongated slot 45 is screwed into the nut portion (threaded nipple) 36 which, in turn, is mounted on the inner lens-barrel 32. The elongated slot 45 is obliquely arranged so that the inner lens-barrel 32 can rotate in relation to the outer lens-barrel 33 and the focus lock screw 46 moves within the elongated slot 45, thereby allowing movement of the inner lens-barrel 32 relative to the outer lens-barrel 33, thus enabling an adjustment of the focal length.

Figure 5:
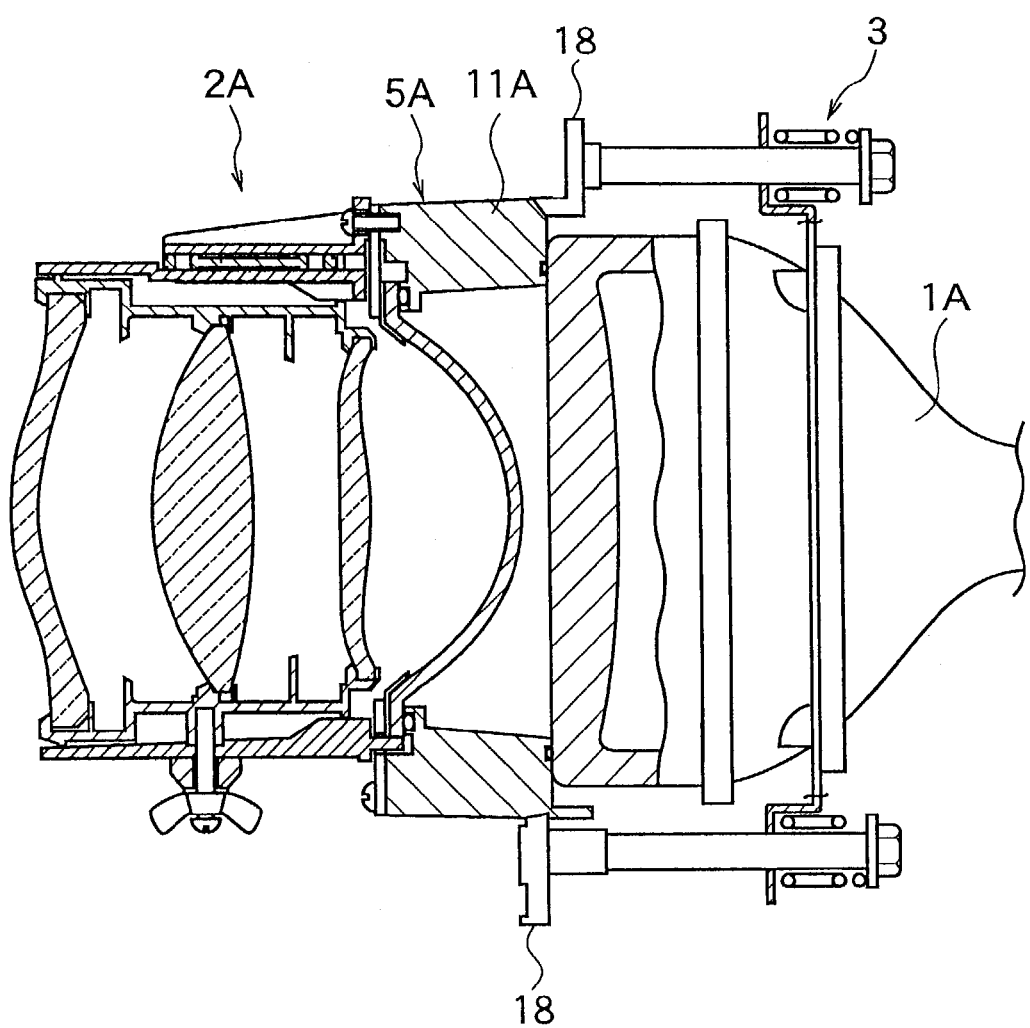
FIG. 5 is a sectional side view showing a CRT and a second embodiment of a projection lens unit according to the present invention.
Figure 6:
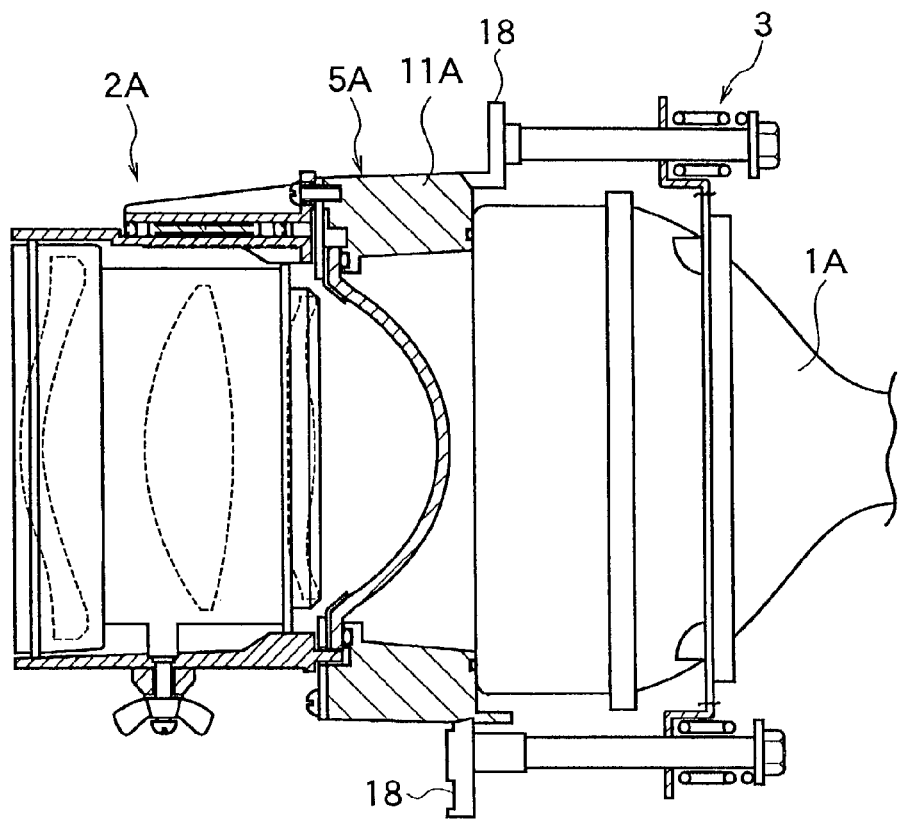
FIG. 6 is a sectional side view showing a CRT and a projection lens unit according to the second preferred embodiment of the present invention.
Figure 7:
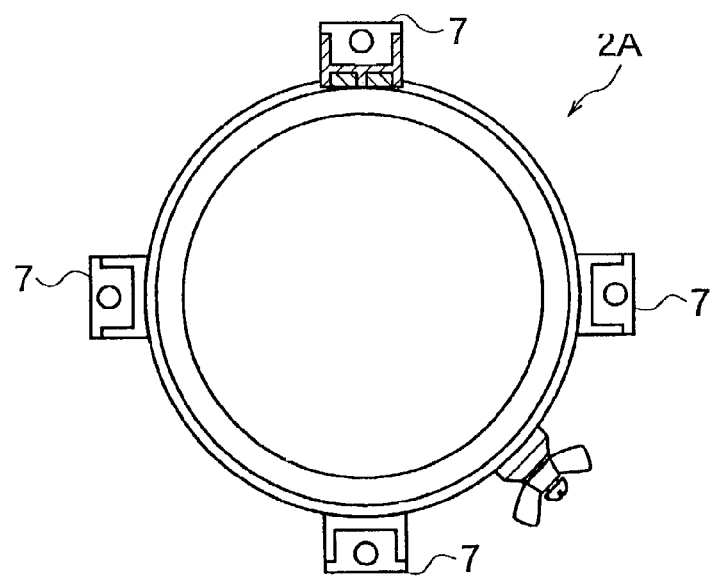
FIG. 7 is a front view of a projection lens unit according to the second preferred embodiment of the present invention.
Figure 8:
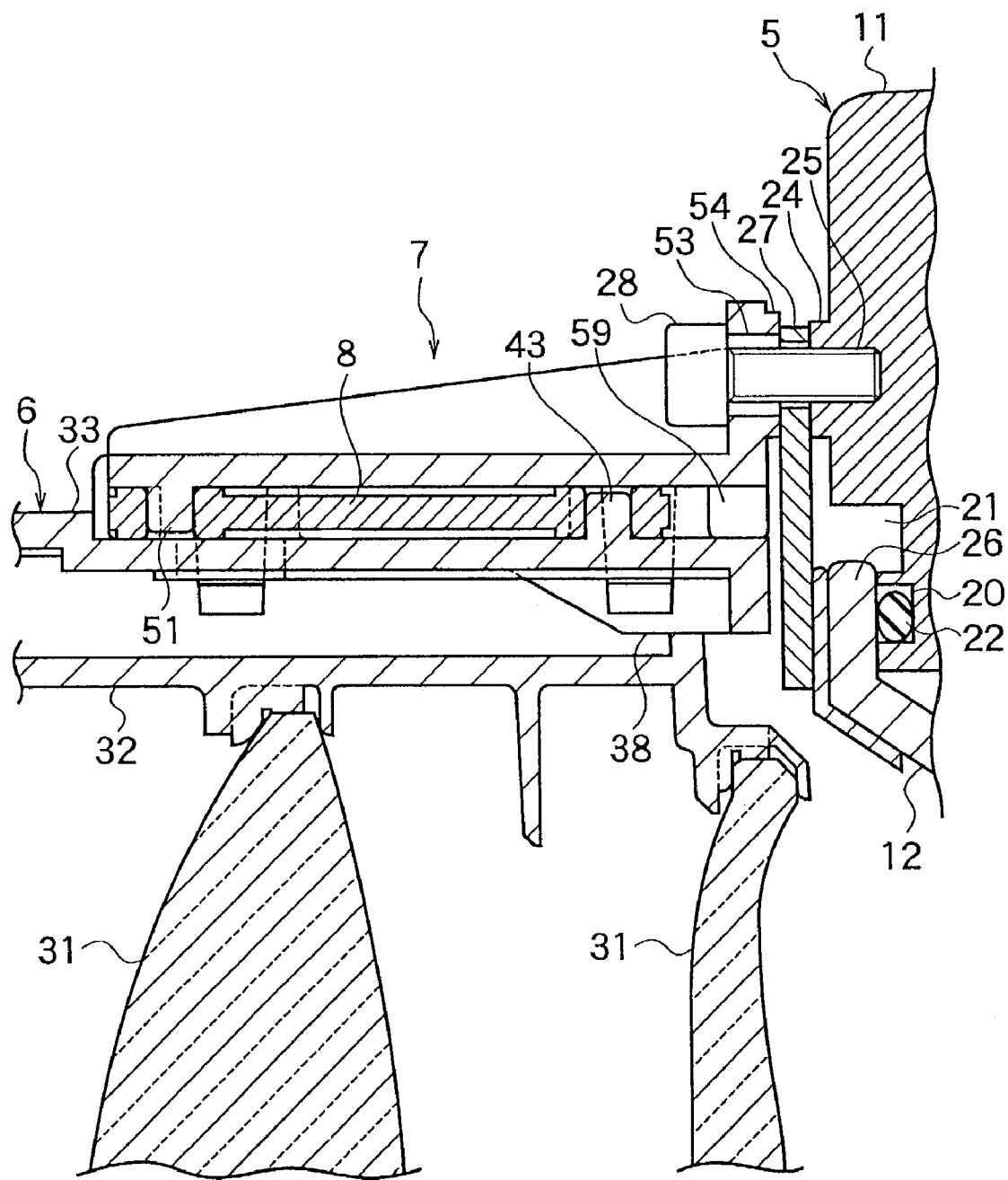
FIG. 8 is a fragmentary, enlarged sectional view of a base end portion of the embodiment of FIGS. 1 and 3.
Figure 9:
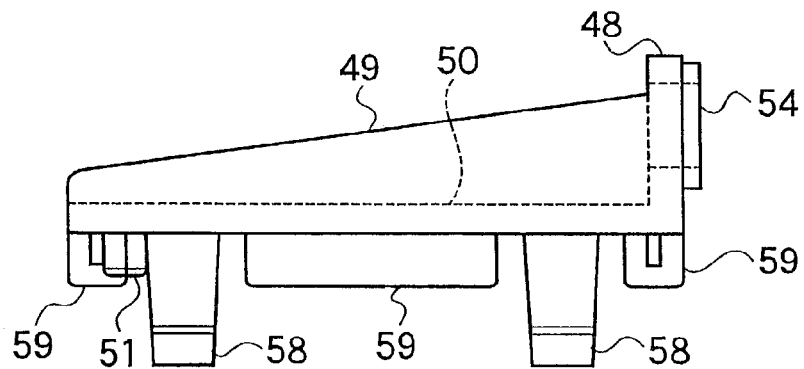
FIG. 9 is aside view of a leg of the embodiment of FIGS. 1, 3 and 8.
Figure 10:
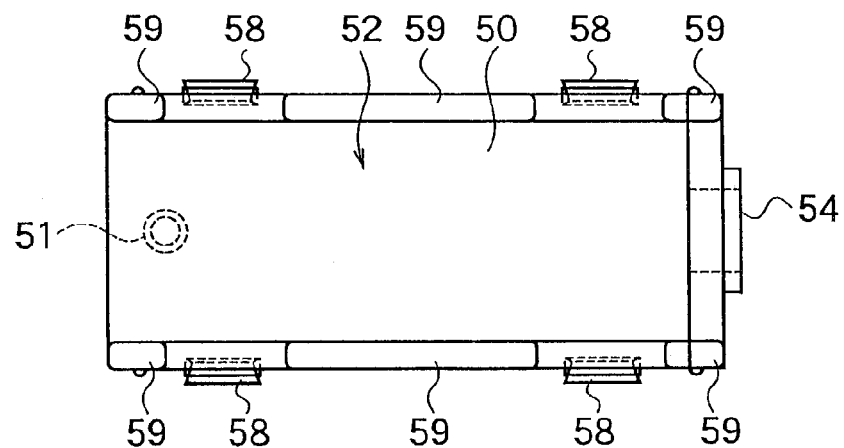
FIG. 10 is a plan view of the leg of FIG. 9.
Figure 11:
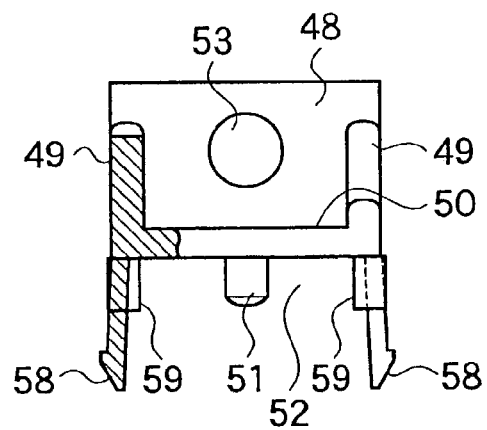
FIG. 11 is a front view of the leg of FIG. 9.
Figure 12:
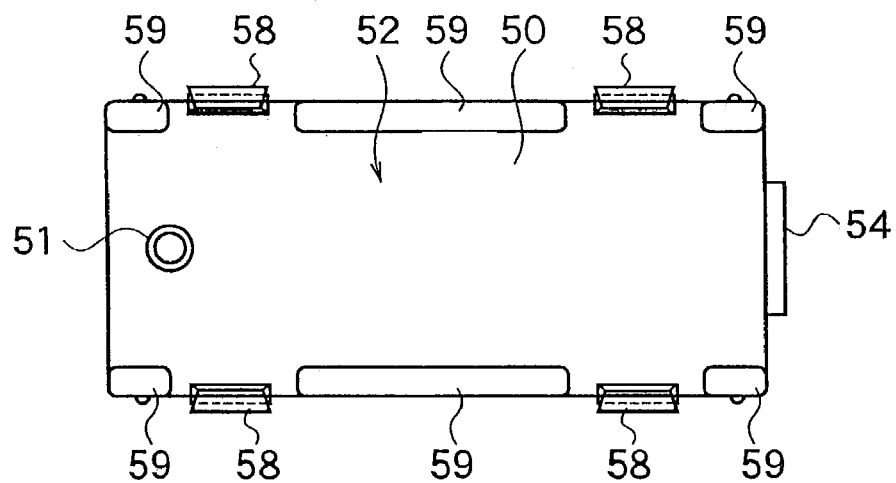
FIG. 12 is a bottom view of the leg of FIG. 9.
Figure 13:
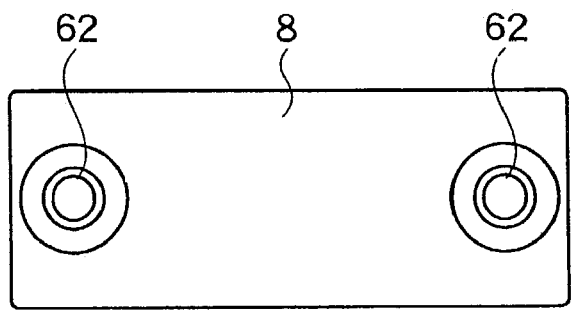
FIG. 13 is a plan view of an expansion/contraction bar according to the embodiment of FIGS. 1 and 3.
Figure 14:
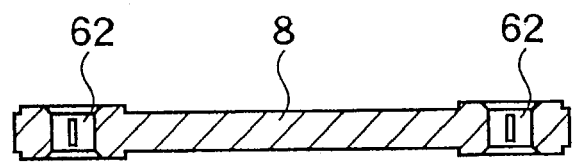
FIG. 14 is a sectional side view of an expansion/contraction bar of FIG. 13.
Figure 15:
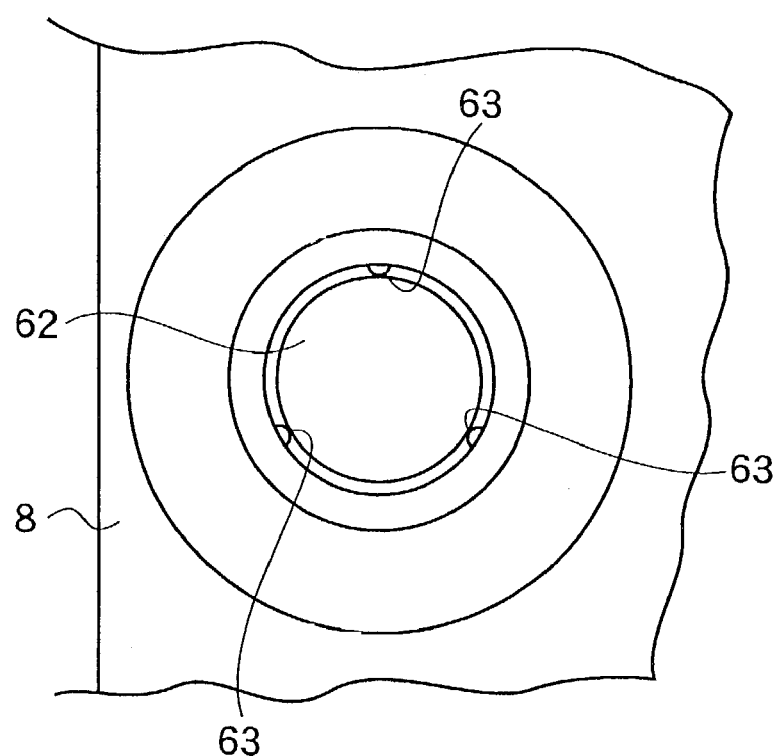
FIG. 15 is a partial plan view of the expansion/contraction bar of FIG. 13, showing an engagement hole.
Figure 16:
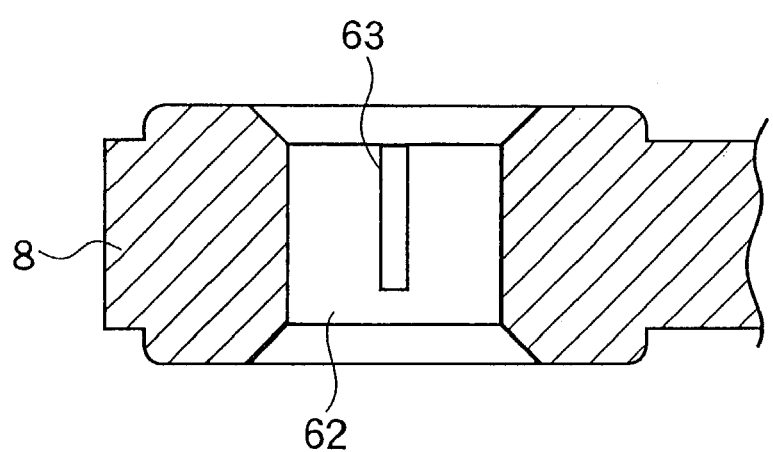
FIG. 16 is a partial sectional side view of the expansion/contraction bar of FIG. 13, showing the engagement hole.

A second embodiment of projection lens unit 2A is shown in FIG. 5 to FIG. 7. The projection lens unit 2A of the second embodiment is generally the same as the projection lens unit 2 of the first embodiment. In order to fit to a smaller CRT 1A, the diameter of the outer cylindrical portion 11A of a coupler 5 is designed to be smaller in this second embodiment. Accordingly, the isolation groove 21 is omitted. The basic construction of the projection lens unit 2A of the second embodiment is generally the same as that of the projection lens unit 2, notwithstanding a slight difference between the two models. The construction of the leg 7 is totally identical in these two models.

As shown in FIG. 9 to FIG. 12, the legs 7 support the lens unit body 6 on the CRT 1 side through the coupler 5. Each leg 7 is formed of a bottom plate 48, standing plates 49, a center plate 50, and a support boss 51 and defines an expansion/contraction bar holding portion 52.

The bottom plate 48 is directly attached to and mounted on the outer cylindrical portion 11. Each bottom plate 48 is provided with a screw-receiving hole 53 so that it can be fixed to the outer cylindrical portion 11 with a mount screw 28. Below the screw-receiving hole 53, is provided a raised portion 54. Each raised portion 54 is mounted on a support table 24 through a C element retaining plate 27 by a mount screw 28.

Two standing plates 49 are provided on opposing sides of the center plate 50. Each standing plate 49 is shaped generally as a triangle with its width narrowing toward the front (upward). This construction gives a sufficient strength to the legs 7 without taking a large space. The standing plates 49 are integrated with the bottom plate 48 at their bottom end and are also integrated with the center plate 50.

At the side of the leg 7 attaching to the outer lens-barrel 33 are a plurality of latch arms 58 and retaining plates 59. The latch arms 58 fix the legs 7 to the outer lens-barrel 33 by engagement within the latch-engaging slots 42 of the leg engaging recesses 41. The width of each latch arm 58 (the horizontal dimension in FIG. 9) is smaller than the length of a latch-engaging slot 42 so that the legs 7 can move vertically when being engaged within the leg engaging recesses 41. This construction is employed in order to allow for thermal expansion. The retaining plates 59 are provided along opposing edges of center plate 50 defining gaps where the latches 58 are provided. These retaining plates 59 are provided in a manner that they abut the expansion/contraction bar 8 from opposing sides. These retaining plates 59 and the center plate 50 together form the expansion/contraction bar holding portion 52 which supports the expansion/contraction bar 8 while allowing thermal expansion and thermal contraction thereof. In other words, by allowing thermal expansion and contraction of the expansion/contraction bar 8 which is supported by the expansion/contraction bar holding portion 52, the spacing between support bosses 43, 51 is adjusted in accordance with temperature change.

The center plate 50 and each standing plate 49 together form a H-shape in its plan view. This configuration provides the leg 7 with sufficient strength. The support boss 51 is provided on the surface of the center plate 50 at the outer lens-barrel 33. The support boss 51 supports the expansion/contraction bar 8 by seating within the engagement hole 62 of the expansion/contraction bar 8.

The expansion/contraction bar 8 serves to absorb the effect of thermal expansion and thermal contraction. In other words, this member absorbs various effects of heat such as movement of the lens unit body 6 relative to the CRT 1 and thermal expansion and contraction of the lenses 31, in order to project clear images onto the screen with a predetermined focus. The expansion/contraction bar 8 is a rectangular plate, as shown in FIG. 13 to FIG. 16. At both ends of the expansion/contraction bar 8, is provided an engagement hole 62, each of which receives a support boss (pin) 43, 51 seated therein. The inside diameter of each engagement hole 62 is designed to be slightly larger than the outside diameter of the support bosses 43 and 51. On the inner surface of each engagement hole 62 is provided a raised support ridge 63. The raised support ridges 63 stably support the support bosses 43, 51 seated within the engagement holes 62, respectively. Three raised support ridges 63 are equally spaced around the periphery of each support bosses 43, 51 and extend in parallel with the axis. In this construction, the raised support ridges 63 stably support the support boss 43, 51 from three directions. A taper provided at the opening of the engagement holes 62 allows easy insertion of the support bosses 43 and 51.

The expansion/contraction bars 8 are mounted in the expansion/contraction bar holding portions 52 with each support boss 43, 51 respectively inserted into a engagement hole 62. The material and dimensions of the expansion/contraction bar 8 are selected in accordance with such parameters as heating characteristics of the CRT 1, ambient temperature, thermal expansion coefficient of the legs 7 and the lens unit body 6. Specifically, the material and dimensions of the expansion/contraction bar 8 are determined so as to achieve the coefficient of linear thermal expansion (the change) effective to absorb the thermally induced changes such as expansion or contraction of the coupler 5, the lens unit body 6, and the legs 7, resulting from heating by the CRT 1. Accordingly, the coefficient of linear thermal expansion of the expansion/contraction bar 8 is set to be different from those of the lens unit body 6 and the legs 7. In concrete terms, the coefficient of linear thermal expansion of the expansion/contraction bar 8 is set to the value at which the combined thermal changes of the lens unit body 6 and the legs 7 are absorbed, thereby compensating for the changes of the lens unit body 6 and the legs 7. The coefficient of linear thermal expansion of the expansion/contraction bar 8 is experimentally, in an individual and concrete manner. The dimensions of the expansion/contraction bar holding portion 52 are determined in accordance with the expansion/contraction bar 8. Practical materials for legs 7 and the expansion/contraction bar 8 include polycarbonate, polypropylene and the like.

Now, assembly of the lens unit body 6 of the projection lens unit 2 will be described below.

First, the expansion/contraction bars 8 are attached to the expansion/contraction bar holding portions 52 of the legs 7. The expansion/contraction bars 8 are held in the expansion/contraction bar holding portions 52 by being pushed into between the retaining plates 59, with one of the engagement holes 62 seating on the support boss 51. Thereafter, the legs 7 are mounted on the leg engaging recesses 41 of the lens unit body 6. The latch arms 58 of the legs 7 are inserted to the latch-engaging slots 42 of the leg engaging recesses 41 for engagement. Accordingly, the other engagement hole 62 of the expansion/contraction bar 8 is engaged with the support boss 43 in the leg engaging recesses 41.

Thereafter, the legs 7 are positioned on the support tables 24 of the outer cylindrical portion 11 through the C element retaining plates 27, and the mounting screws 28 are inserted through the screw-receiving holes 53 on the bottom plates 48 and screwed down into the screw-receiving holes 25. Accordingly, the lens unit body 6 is secured to the coupler 5 through the legs 7.

In the projection lens unit 2 of the above construction, the effect of heat is absorbed as described below.

Heat generated by the CRT 1 in use of the projector or heat of ambient temperature is transferred to the lens unit body 6, causing each portion to go through thermally induced changes such as thermal expansion. On this occasion, the legs 7 and the expansion/contraction bars 8 also thermally expand. The legs 7 expand toward the distal end of the projection lens unit 2. On the other hand, the expansion/contraction bars 8 expand relative to the base ends of the legs 7 when heated, because the engagement hole 62 at the tip end side is fitted on a support boss 51 of leg 7, thus preventing the position of the lens unit body 6 relative to the coupler 5 from changing upon thermal expansion, and the expansion/contraction bar 8 expands so that the lens unit body 6 is optimally positioned.

When replacing the lens of the projection lens unit 2 with another lens of a different design, the inner lens-barrel 32 should be replaced. Accordingly, a variety types of the inner lens-barrels 32 should be prepared beforehand. In replacing the lens, the inner lens-barrel 32 is removed from the outer lens-barrel 33 of the lens unit body 6 and another type of inner lens-barrel is introduced therein. Change of the lens unit body 6 to another design is completed just by this operation.

As described above, because the expansion/contraction bars 8 correct the outer lens-barrel 33 by expanding/contracting in accordance with the thermally induced changes of the legs 7 or the lenses 31 and the like, it is possible to obtain an automatic compensation with high accuracy. In other words, because the unit is equipped with the expansion/contraction bars 8 provided between the legs 7 and the lens unit body 6 for compensating for the effect of heat, with one end of each engaged with the tip end side of a leg 7 and the other end engaged with the base of the lens unit body 6, the thermally-induced changes of the legs 7 and the lens unit 6 can be compensated for by the expansion/contraction bars 8 through the changes thereof in the reverse direction, thereby allowing an accurate and automatic compensation.

Because the expansion/contraction bar 8 has a coefficient of linear thermal expansion which is different from those of the lens unit body 6 and the legs 7, the thermally-induced changes in the lens unit body 6 and in the legs 7 can be compensated for by the expansion/contraction bars 8 with the different coefficient of linear thermal expansion. As a consequence, automatic compensation with high accuracy is achieved.

The latch-engaging slots 42 are longer than the width of the latch arms, so that the legs 7, when mounted on the lens unit body 6 through the engagement of the latch arms 58 with the latch-engaging slots 42, are allowed to axially slide. Accordingly, compensation is provided for thermal contraction or thermal expansion of the expansion/contraction bars 8, thus enabling automatic compensation with high accuracy.

Also, since the lens unit body 6 is supported by the legs 7 at four locations on the unit, the lens unit body 6 is stably secured, and at the same time compensation by thermal contraction or thermal expansion occurs evenly made at those four locations, enabling automatic compensation with high accuracy.

Further, the latch arms 58 and the latch-engaging slots 42 absorb the thermally induced changes, thus preventing aging of the projection lens unit 2 and improving the reliability thereof.

Moreover, the connecting structure by which the expansion/contraction bars 8 are attached to the expansion/contraction bar holding portions 52 of the legs 7 does not occupy a large space, consequently making the projection lens unit 2 more compact.

Where inner lens-barrels 32 of a variety of designs of lenses and outer lens-barrels 33 of different shapes are provided, it is possible to adapt to a variety of types of CRTs 1 and at the same time provide the projection lens unit 2 with various capabilities.

In addition, the assembly of the unit is easy because the legs 7 can be installed on the lens unit body 6 simply by seating the expansion/contraction bars 8 within the expansion/contraction bar holders 52 of the legs 7, and engaging the latch arms 58 of the legs 7 within the latch-engaging slots 42, while the engagement holes 62 at one end of the expansion/contraction bars 8 are each secured on a support boss 51 of a leg 7.

Since the expansion/contraction bars 8 are practically secured to the outer lens-barrel 33 of the lens unit body 6 and the legs 7, the changes thereof substantially coincide with the thermal-induced changes of the outer lens-barrel 33 and the legs 7, thus achieving a better response and the optimum compensation for temperature change.

In the lens unit body 6 which is comprised of the inner lens-barrel and the outer lens-barrel, the outer lens-barrel is fixed to the image light source by the legs. This configuration reduces the diameter of the outer lens-barrel and consequently the unit can be made smaller.

Although four legs 7 are provided on the periphery of the outer lens-barrel 33 in the above-described embodiment, two, three or more than five legs 7 may be provided.

When only two legs 7 are provided to support the lens unit body 6 and the lens unit body 6 cannot stably slide, it is desirable that another member be provided to support the lens unit body 6 so that the lens unit body 6 can stably slide. If the lens unit body 6 can stably slide in this construction, no additional measure is required. In the example mentioned above, it is possible to slidably support the lens unit body 6 in a stable manner by engaging the latch arms 58 within the latch-engaging slots 42 of the leg engaging recesses 41 and without providing a expansion/contraction bar 8 for each leg 7. In the example mentioned above, the expansion/contraction bars 8 may be removed from two out of four legs 7, as compensation for the thermally induced changes can be provided by the remaining expansion/contraction bars 8. Also, other means such as a sliding rail, a slider and the like may be used to provide stable sliding of the lens unit body 6.

When more than three legs 7 are provided to support the lens unit body 6, and the lens unit body 6 can be stably supported by these legs alone, and no other member is required for sliding of the lens unit body. In this construction, the legs 7 which are provided on the lens unit body 6 at more than three locations can stably support the lens unit body 6, and at the same time the thermally induced changes can be evenly compensated for at more than three locations.

When two, three or five legs 7 are provided and compensation is made by the expansion/contraction bars 8, the legs 7 provided with the expansion/contraction bars 8 should be positioned so as to provide for even compensation. Although the legs 7 do not need to be equally spaced as long as even compensation can be achieved, generally it is desirable that the legs 7 be equally spaced, which achieves automatic compensation with high accuracy.

Although the lens unit body 6 is comprised of the inner lens-barrel 32 which supports the lenses 31, and the outer lens-barrel 33 which supports the inner lens-barrel 32 in the above-mentioned embodiment, the present invention may be applied to a lens unit body which is comprised of the outer lens-barrel 33 only. The present invention can be also applied to a lens unit body in which the outer lens-barrel 33 supports the lenses 31 and thermally induced problems are similar. In this case also, the same operation and advantageous effect of the invention may be obtained as in the above-described embodiment.

Although the latch arms 58 are integral with the legs 7 and the latch-engaging slots 42 are in the outer lens-barrel 33 of the lens unit body 6 in the above-described embodiment, the locations of these members may be reversed, i.e. the latch arms 58 may be located on the outer lens-barrel 33 of the lens unit body 6 and the latch-engaging slots 42 located in the legs 7. In this case also, the same operation and advantageous effect of the invention can be obtained as in the above-mentioned embodiment.

Although the projection lens unit 2 is used in a projector in the above-described embodiment, it may be also used in other types of optical apparatus. Also, the present invention may be applied, not only to the CRT 1, but also to a liquid crystal screen. In this case also, the same operation and advantageous effect of the invention as in the above-described first embodiment can be obtained.

Although two engagement holes 62 are provided in each expansion/contraction bar 8 and are fitted on each of the support bosses 43 and 51 in the above-mentioned embodiment, alternatively, more than three engagement holes 62 may be provided in each expansion/contraction bar 8 in order to provide for variance in the positions of the support bosses 43, 51. A plurality of expansion/contraction bars 8 with different dimensions may be prepared beforehand in accordance with various positions of the support bosses 43, 51. The positions of the support bosses 43 and 51 may be also changed accordingly so as to provide an appropriate compensation in accordance with the changes in temperature of the CRT 1 and the ambient temperature. In this case also, the same operation and advantageous effect of the invention can be obtained as in the above-described first embodiment.

Although the legs 7 are supported on the outer lens-barrel 33 by engagement of the latch-engaging slots 42 with the latch arms 58 in the above-described embodiment, the legs 7 may be supported on the outer lens-barrel 33 with each expansion/contraction bar 8 being fixed to a leg 7 at one end and one engagement hole 62 of each expansion/contraction bar 8 at the other end being engaged with the support boss 43 on the outer lens-barrel 33. The legs 7 thus supported on the outer lens-barrel 33 at more than three locations do not create a frictional contact, thereby improving accuracy and also preventing aging.

The invention claimed is:

1. A projection lens unit comprising:
    a lens unit body, containing at least one lens, for projecting an image light along an optical axis, from a base end at a side of an image light source;
    a plurality of legs for fixing the base end of said lens unit body to the side of the image light source, said legs being attached to the outer peripheral surface of the base end of the lens unit body and each leg defining a holding portion; and
    a plurality of expansion and contraction bars for compensating for thermally induced expansion and contraction, said expansion and contraction bars being housed within respective holding portions, between said legs and said lens unit body, each expansion and contraction bar having one end engaged with a tip end portion of a leg and another end, opposite said one end, engaged with the base end of the lens unit body.

2. The projection lens unit according to claim 1, wherein each of said expansion and contraction bars has a coefficient of linear thermal expansion which is different from those of said lens unit body and said legs.

3. The projection lens unit according to claim 1, wherein said legs support said lens unit body at more than two points.

4. The projection lens unit according to claim 2, wherein said legs support said lens unit body at more than two points.

5. The projection lens unit according to claim 1, wherein said lens unit body comprises an outer lens-barrel which is directly supported by said legs, an inner lens-barrel housed inside said outer lens-barrel, and said at least one lens being attached to and to inside said inner lens-barrel.

6. The projection lens unit according to claim 2, wherein said lens unit body comprises an outer lens-barrel which is directly supported by said legs, an inner lens-barrel housed inside said outer lens-barrel, and said at least one lens being attached to and inside said inner lens-barrel.

7. The projection lens unit according to claim 3 wherein said lens unit body comprises an outer lens-barrel which is directly supported by said legs, an inner lens-barrel housed inside said outer lens-barrel, and said at least one lens being attached to and to inside said inner lens-barrel.

8. The projection lens unit according to claim 4, wherein said lens unit body comprises an outer lens-barrel which is directly supported by said legs, an inner lens-barrel housed inside said outer lens-barrel, and said at least one lens being attached to and inside said inner lens-barrel.

9. The projection lens unit according to claim 1, wherein said legs are provided with latch arms or latch arm engaging slots, wherein said lens unit body is provided with the other of said latch arm engaging slots and latch arms, wherein said latch arms are inserted with said latch arm engaging slots to secure said legs to said lens unit body, and wherein said latch engaging slots extend in parallel with the optical axis and are longer than the width of said latch arms.

10. The projection lens unit according to claim 2, wherein said legs are provided with latch arms or latch arm engaging slots, wherein said lens unit body is provided with the other of said latch arm engaging slots and latch arms, wherein said latch arms are inserted with said latch arm engaging slots to secure said legs to said lens unit body, and wherein said latch engaging slots extend in parallel with the optical axis and are longer than the width of said latch arms.

11. The projection lens unit according to claim 3, wherein said legs are provided with latch arms or latch arm engaging slots, wherein said lens unit body is provided with the other of said latch arm engaging slots and latch arms, said latch arms are inserted with said latch arm engaging slots to secure said legs to said lens unit body, and wherein said latch engaging slots extend in parallel with the optical axis and are longer than the width of said latch arms.

12. The projection lens unit according to claim 4, wherein said legs are provided with latch arms or latch arm engaging slots, wherein said lens unit body is provided with the other of said latch arm engaging slots and latch arms, wherein said latch arms are inserted with said latch arm engaging slots to secure said legs to said lens unit body, and wherein said latch engaging slots extend in parallel with the optical axis and are longer than said latch arms.

13. The projection lens unit according to claim 5, wherein said legs are provided with latch arms or latch arm engaging slots, wherein said lens unit body is provided with the other of said latch arm engaging slots and latch arms, wherein said latch arms are inserted with said latch arm engaging slots to secure said legs to said lens unit body, and wherein said latch engaging slots extend in parallel with the optical axis and are longer than the width of said latch arms.

14. The projection lens unit according to claim 6, wherein said legs are provided with latch arms or latch arm engaging slots, wherein said lens unit body is provided with the other of said latch arm engaging slots and latch arms, said latch arms are inserted with said latch arm engaging slots to secure said legs to said lens unit body, and wherein said latch engaging slots extend in parallel with the optical axis and are longer than the width of said latch arms.

15. The projection lens unit according to claim 7, wherein said legs are provided with latch arms or latch arm engaging slots, wherein said lens unit body is provided with the other of said latch arm engaging slots and latch arms, wherein said latch arms are inserted with said latch arm engaging slots to secure said legs to said lens unit body, and wherein said latch engaging slots extend in parallel with the optical axis and are longer than the width of said latch arms.

16. The projection lens unit according to claim 8, wherein said legs are provided with latch arms or latch arm engaging slots, wherein said lens unit body is provided with the other of said latch arm engaging slots and latch arms, wherein said latch arms are inserted with said latch arm engaging slots to secure said legs to said lens unit body, and wherein said latch engaging slots extend in parallel with the optical axis and are longer than the width of said latch arms.

17. The projection lens unit according to claim 1 wherein each of said legs includes a bottom plate and side plates integral with said bottom plate and extending perpendicular thereto, said bottom plate and said side plates defining said holding portion in cooperation with the outer peripheral surface of the base end of the lens unit body.

18. The projection lens unit according to claim 17 wherein a plurality of recesses are formed in the outer peripheral surface of the base end of the lens unit body, each of said recesses having the side plates of a leg fitted therein.

19. The projection lens according to claim 1 wherein each of said expansion and contraction bars has a hole adjacent each of longitudinally opposed ends and wherein a pin integral with said lens unit body and extending outwardly from said recess is seated within one of said holes and a pin integral with a leg is seated within the other of said holes.

20. The projection lens unit according to claim 9 wherein each of said legs includes a bottom plate and side plates integral with said bottom plate and extending perpendicular thereto, said bottom plate and said side plates defining said holding portion in cooperation with the outer peripheral surface of the base end of the lens unit body.

* * * * *

UNITED STATES PATENT AND TRADEMARK OFFICE
CERTIFICATE OF CORRECTION

| | | |
|---|---|---|
| PATENT NO. | : 7,023,629 B2 | Page 1 of 1 |
| APPLICATION NO. | : 10/424138 | |
| DATED | : April 4, 2006 | |
| INVENTOR(S) | : Kumajiro Sekine et al. | |

It is certified that error appears in the above-identified patent and that said Letters Patent is hereby corrected as shown below:

Column 11, line 7 (claim 5, line 5) "to and to" should read -- and to --.

Column 11, line 17 (claim 7, line 5) "to and to" should read -- and to --.

Column 11, line 42 (claim 11, line 4) "arms, said" should read -- arms, wherein said --.

Column 11, line 51 (claim 12, line 5) "with" should read -- within --.

Column 12, line 3 (claim 13, line 5) "with' should read -- within --.

Column 12, line 10 (claim 14, line 4) "arms, said" should read -- arms, wherein said --.

Column 12, line 11 (claim 14, line 5) "with" should read -- within --.

Column 12, line 19 (claim 15, line 5) "with" should read -- within --.

Column 12, line 28 (claim 16, line 5) "with" should read -- within --.

Signed and Sealed this

Twenty-first Day of November, 2006

JON W. DUDAS
*Director of the United States Patent and Trademark Office*